United States Patent [19]

Whitehead et al.

[11] 4,231,306
[45] Nov. 4, 1980

[54] APPARATUS FOR INJECTING GRANULAR MATERIAL IN SOIL

[75] Inventors: Alan G. Whitehead, Harpenden; David J. Tite, Tring, both of England

[73] Assignee: National Research Development Corporation, London, England

[21] Appl. No.: 878,469

[22] Filed: Feb. 16, 1978

[30] Foreign Application Priority Data

Feb. 23, 1977 [GB] United Kingdom ............... 07620/77

[51] Int. Cl.³ .......................... A01C 7/20; A01C 15/04
[52] U.S. Cl. ........................................... 111/86; 111/7; 111/34
[58] Field of Search ............................. 111/6, 7, 8–12, 111/86, 34, 1, 73, 85, 80, 70, 13; 172/70, 59

[56] References Cited

U.S. PATENT DOCUMENTS

| | | | |
|---|---|---|---|
| 1,348,038 | 7/1920 | Neumeyer | 111/7 UX |
| 1,667,923 | 5/1928 | Bishop | 111/7 |
| 2,968,266 | 1/1961 | Gustafson | 111/7 X |
| 2,988,026 | 6/1961 | Heckathorn | 111/7 |
| 3,007,843 | 11/1961 | Luckenbaugh | 111/6 |
| 3,186,719 | 6/1965 | Sosalla | . |
| 3,439,636 | 4/1969 | Lemke | 111/7 |
| 3,804,036 | 4/1974 | Seifert, Jr. | 111/7 X |
| 3,863,842 | 2/1975 | McFarland et al. | 111/7 X |
| 3,899,029 | 8/1975 | van der Lely | 111/10 X |
| 4,108,089 | 8/1978 | van der Lely | 111/7 |

FOREIGN PATENT DOCUMENTS

| | | | |
|---|---|---|---|
| 165199 | 9/1955 | Australia | 111/7 |
| 239965 | 8/1962 | Australia | 111/86 |
| 648634 | 9/1962 | Canada | 111/86 |
| 76405 | 5/1919 | Fed. Rep. of Germany | 111/86 |
| 1936446 | 1/1970 | Fed. Rep. of Germany | 111/10 |
| 1333998 | 6/1963 | France | 111/7 |
| 1463576 | 12/1966 | France | 111/85 |
| 1550012 | 12/1968 | France | 111/7 |
| 1564295 | 4/1969 | France | 111/85 |
| 2028276 | 10/1970 | France | 111/7 |
| 2275981 | 1/1976 | France | 111/7 |
| 2330296 | 6/1977 | France | 111/85 |
| 36498 | 7/1954 | Poland | 111/7 |
| 723105 | 2/1955 | United Kingdom | . |
| 1136008 | 12/1968 | United Kingdom | . |
| 1187179 | 4/1970 | United Kingdom | 111/85 |
| 1197626 | 7/1970 | United Kingdom | 111/7 |
| 1361611 | 7/1974 | United Kingdom | . |
| 1407590 | 9/1975 | United Kingdom | . |
| 136598 | 3/1960 | U.S.S.R. | 111/86 |

OTHER PUBLICATIONS

Pagell, Feb. 1969, issue of "Power Farming Magazine".

*Primary Examiner*—Steven A. Bratlie
*Attorney, Agent, or Firm*—Oblon, Fisher, Spivak, McClelland & Maier

[57] ABSTRACT

Apparatus for injecting granular material such as nematicide in soil comprises a frame carrying a plurality of tines for opening vertical slits in the soil when dragged through the soil by movement of the frame. Each tine has a conduit for delivering granular material to the rear of the tine, and each tine also has an outlet means connected to the conduit of the tine. Each outlet means has one or more outlet openings for directing the granular material rearwardly of the tine. Each outlet means is shaped for guiding granular material in a flow path or flow paths leading from the conduit to the one or a group of outlet openings for directing the granular material rearwardly predominantly in a vertically dispersed distribution. Preferably each outlet means has an upper outlet opening directing granular material in an upward direction rearwardly of the tine, a lower outlet opening directing granular material in a downward direction rearwardly of the tine, and a further outlet opening directed in a direction intermediate the directions of the upper and lower openings. Preferably each outlet means includes a chamber disposed in the said flow path or flow paths, the chamber having a curved wall arranged to guide the granular material along the said flow path or flow paths.

19 Claims, 3 Drawing Figures

APPARATUS FOR INJECTING GRANULAR MATERIAL IN SOIL

BACKGROUND OF THE INVENTION

Field of the Invention

The present invention relates to apparatus and method for injecting granular materials in soil, and relates in particular but not exclusively to the injecting of nematicides in the soil.

In many areas the production of potatoes is limited by a particular class of pest known as nematodes which are distinguished in one aspect by the particularly long time scale during which they can infest the land in a semi-dormant form even though the crop upon which they feed is not grown. For example where land used for potato cropping is found to be infested with potato cyst-nematodes, it may be necessary, in the absence of any treatment, to leave the land for ten years before potatoes can safely be grown again. This is because the eggs of the nematodes remain in the ground with only limited hatching each year. The proportion of eggs hatched is related to the concentration remaining so that the fall in population is exponential.

DESCRIPTION OF THE PRIOR ART

Methods of controlling nematodes in land for growing potatoes fall into three main classes. Resistant varieties of potatoes have been bred, but in the U.K. these have proved to be resistant only to one of the two species of potato cyst-nematode, and the other species eventually increases where resistant varieties are grown. A second method of control is by crop rotation but as has been mentioned it may be necessary to rest the ground from ptotato crops for a very long period in severe cases.

The last form of control is by use of nematicides and these comprise soil fumigants and granular nematicide materials. The soil fumigants are applied by injecting into the soil a liquid which vaporizes in the soil. The liquid is metered by a land-wheel driven pump which feeds the liquid to conduits behind coulters. The advantage of this system is that the fumigant spreads itself through the soil by the vaporizing process, but a disadvantage is that in clay or peat soils the vapour is adsorbed by the soil. Furthermore liquid fumigants are bulky, and there is not a complete control of the nematodes. Also it is necessary to leave an interval between soil fumigation and planting the next potato crop.

The most effective nematicides are granular nematicides, for example nematicides known as aldicarb and oxamyl. These materials are in the form of a fine granular material, the granules being typically of a size in the range 1 to 2 mm.

Known methods of applying these granular nematicides include the steps of spreading the nematicides over the top surface of the land, for example by a fertilizer spreader, followed by distributing the nematicide in the soil by a rotovator having rotors revolving about a horizontal axis. If a rotovator is not used, an attempt at dispersal is commonly made by use of a harrow. Although the use of a rotovator produces a reasonably effective distribution of the granules beneath the surface, the use of such an implement is slow and may bring disadvantages to the seed bed such as glazing or smearing of the soil which can result in waterlogging.

In order for these granular nematicides to provide effective control of the pest, it is essential that the nematicide is dispersed throughout the soil evenly to a depth of about 6 inches. Merely applying the nematicide to the surface of the land is not sufficient to provide control of the hatched nematodes.

SUMMARY OF THE INVENTION

According to the present invention there is provided apparatus for injecting granular material in soil comprising a frame for movement over the soil, a plurality of tines carried by the frame each of which is adapted to open a vertical slit in the soil when dragged through the soil by movement of the frame, each tine having associated therewith a conduit for delivering granular material to the rear of the tine, and each tine also having associated therewith an outlet means connected to the conduit of the tine and shaped for guiding granular material in a flow path or flow paths leading from the conduit to one or a group of outlet openings of the outlet means for directing the granular material rearwardly predominantly in a vertically dispersed distribution.

By a tine is meant an elongated earth working element adapted to be dragged through the soil to produce a required opening in the soil. For example each tine may comprise a spring tine of a spring tine harrow or alternatively a straight tine of a straight tine harrow. It will be appreciated that the vertical slit opened by the tine may be immediately closed in by natural movement of the soil after passage of the tine, and this especially will be the case in sandy or light soils.

In preferred arrangements, each outlet means may be arranged to direct a proportion of the granular material upwardly in a direction inclined to horizontal.

Conveniently each outlet means may have a plurality of openings spaced apart from each other vertically. Each opening may define an axis along which granular material is predominantly directed in operation, and preferably the plurality of openings are disposed in such a manner that the axes of the openings all lie substantially in a single vertical plane. It will be appreciated that although the granular material is directed predominantly along the said axis of an opening, the material will spread out from the axis to some extent on leaving the opening and entering the vertical slit in the soil. At least one of the said openings preferably has an axis inclined to the vertical in an upward direction and at least one of the openings preferably has an axis inclined to the vertical in a downward direction. Preferably the said plurality of openings are positioned substantially vertically one above another.

Conveniently the plurality of openings may include an upper outlet opening arranged to direct a proportion of granular material in an upward direction rearwardly of the tine, a lower outlet opening arranged to direct a proportion of the granular material in a downward direction of the tine, and a further outlet opening directed in a direction intermediate the directions of the axes of the upper and lower outlet openings.

Although in many preferred arrangements there are provided a plurality of outlet openings which direct the material in the said vertically dispersed distribution, it will be appreciated that in alternative arrangements each outlet means may have a single outlet opening, for example in the form of an elongated slot-like opening, which directs the material in the said vertically dispersed distribution.

Preferably each outlet means may include a chamber disposed in the said flow path or flow paths between the conduit and the outlet opening or openings, the chamber having a curved wall disposed in the path of granular material leaving the conduit and arranged to guide the granular material through a change of direction along the said flow path or flow paths leading to the said outlet opening or openings. In some preferred arrangements the said curved wall is arranged to guide at least a proportion of the granular material through a change of direction greater than 90°. Preferably the path of material entering the outlet means from the conduit and the flow path or flow paths leading to the outlet opening or openings are both or all disposed in a single substantially vertical plane.

It is also preferred that the conduit and outlet means associated with each tine have a width no greater than the width of the tine taken transverse to the direction of forward movement of the frame. The outlet means associated with each tine may be positioned immediately behind the tine and may be secured directly to the tine.

There is also provided in accordance with the present invention apparatus for injecting granular material in soil comprising an outlet means having an elongated form adapted to be secured to the rear of a tine for opening a vertical slit in the soil when dragged through the soil, the outlet means being adapted to be secured to the rear of such a tine with the elongated form of the outlet means aligned generally along the length of the tine, the outlet means having an inlet opening for connection to a conduit for delivering granular material in an air stream to the outlet means, and the outlet means being shaped to guide granular material in a flow path or paths leading from the inlet opening to one or a group of outlet openings of the outlet means for directing the granular material out from the outlet means predominantly in an elongated distribution aligned generally in a common plane with said elongated form of the outlet means, and in a direction such as to be directed rearwardly of a tine when the outlet means is attached to the tine.

Conveniently the outlet means has securing means for securing the outlet means to the rear of a tine in operation.

In some preferred arrangements the outlet means may have a plurality of openings spaced apart from each other in a direction generally along the length of the said elongated form of the outlet means. Each outlet opening may define an axis along which granular material is predominantly directed in operation, and the plurality of outlet openings are preferably disposed in such a manner that the axes of the openings all lie in a common plane with the said elongated form of the outlet means. Preferably the said axes are inclined to each other within the said plane.

In preferred arrangements, the outlet means may include a chamber disposed in the path of material flowing from the inlet opening to the said outlet opening or openings, the chamber having a curved wall disposed in the path of granular material entering the outlet means through the inlet opening and arranged to guide the granular material through a change of direction along the said flow path or flow paths leading to the said outlet opening or openings. In some preferred arrangements the said curved wall is arranged to guide at least a proportion of the granular material through a change of direction greater than 90°.

There is further provided in accordance with the present invention a method of injecting granular material in soil comprising the steps of producing a vertical slit-like opening in the soil, delivering to the slit-like opening in the soil granular material disposed predominantly in a vertically dispersed distribution, and distributing the material horizontally in the soil by agitating the soil by an earth working implement.

Preferably the step of distributing the material horizontally in the soil comprises agitating the soil by a rotary earth working action, most preferably by an earth working implement having at least one rotor rotating about an axis which is vertical or inclined to the horizontal.

The step of delivering granular material into the slit-like opening in the soil may be carried out by blowing the granular material down a conduit in an air stream, and also may include blowing the granular material into the slit-like opening in the soil in a plurality of discrete jets of airborne material, the jets being directed to diverge from each other in a vertical plane.

The step of delivering the granular material into the slit-like opening in the soil may consist of spreading the granular material substantially evenly in a vertical plane over a depth of about 6 inches.

The method according to the invention is particularly suitable for application of pesticides, such as nematicides, for example aldicarb and oxamyl, but may also be used for pesticides such as herbicides, insecticides and fungicides.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
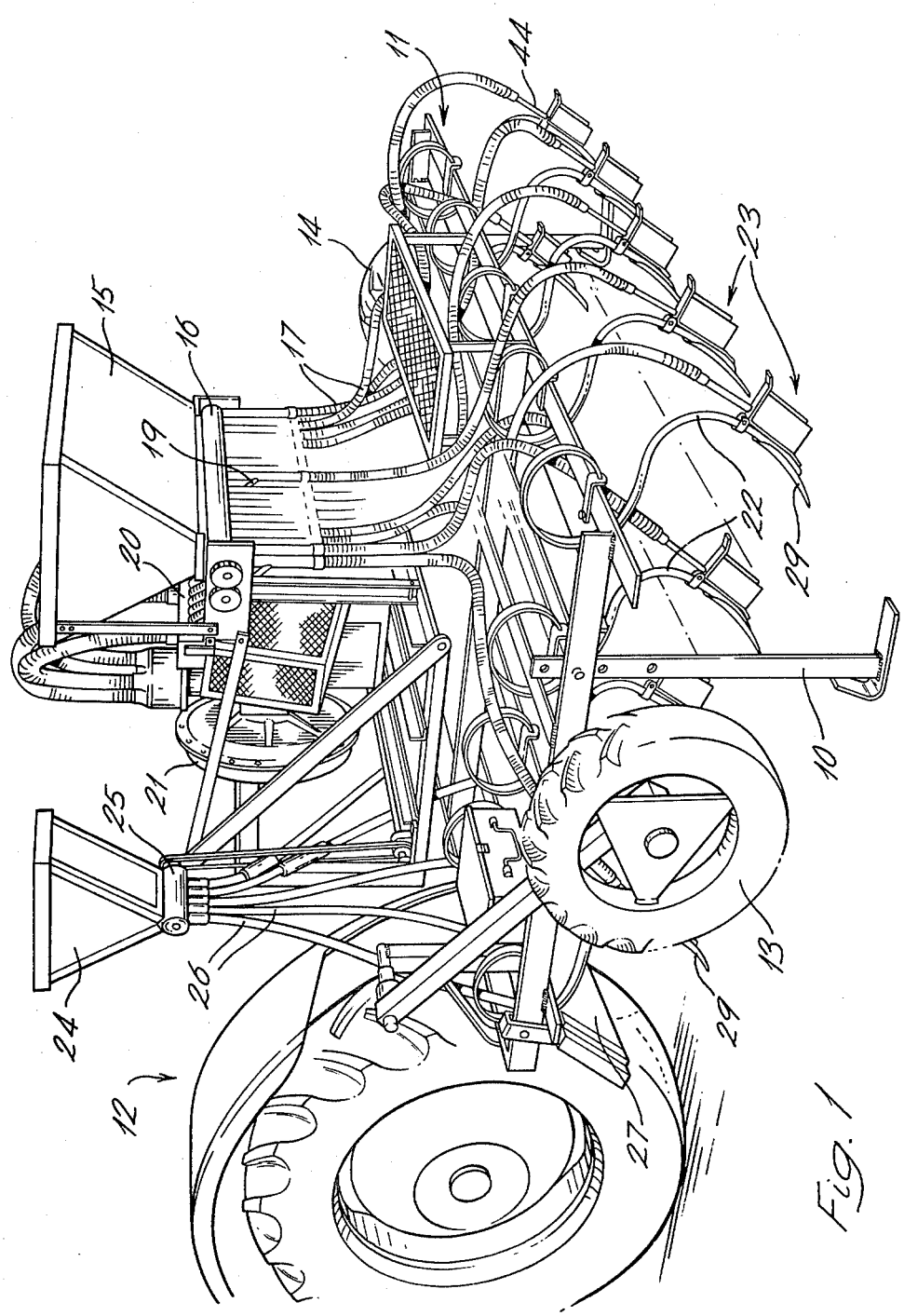
FIG. 1 is a perspective view of apparatus for injecting granular material in soil embodying the invention.

Referring firstly to FIG. 1, the apparatus comprises a main frame 11 which is fully-mounted on a tractor indicated at 12, and which has side wheels 13 and 14. Mounted on the frame 11 is a hopper 15 for granular nematicide, the hopper having at its base a pair of fluted metering rollers contained in a tubular housing 16 for feeding the nematicide to twenty conduits 17 distributed along the roller housing 16. Each conduit 17 comprises an inner tube which protrudes into the main conduit and is coupled to the base of the metering rollers so as to deliver granular material into the conduit 17. Each conduit 17 also includes an air inlet tube 19 which directs air under pressure into the annular space between the said inner tube and the conduit 17. The air inlet tube 19 is joined to a manifold 20 which is fed with air under pressure from a blower 21. In the example shown the blower 21 is driven by a petrol engine (not shown), but conveniently in an alternative arrangement the blower may be driven by the tractor p.t.o. shaft.

Figure 2:
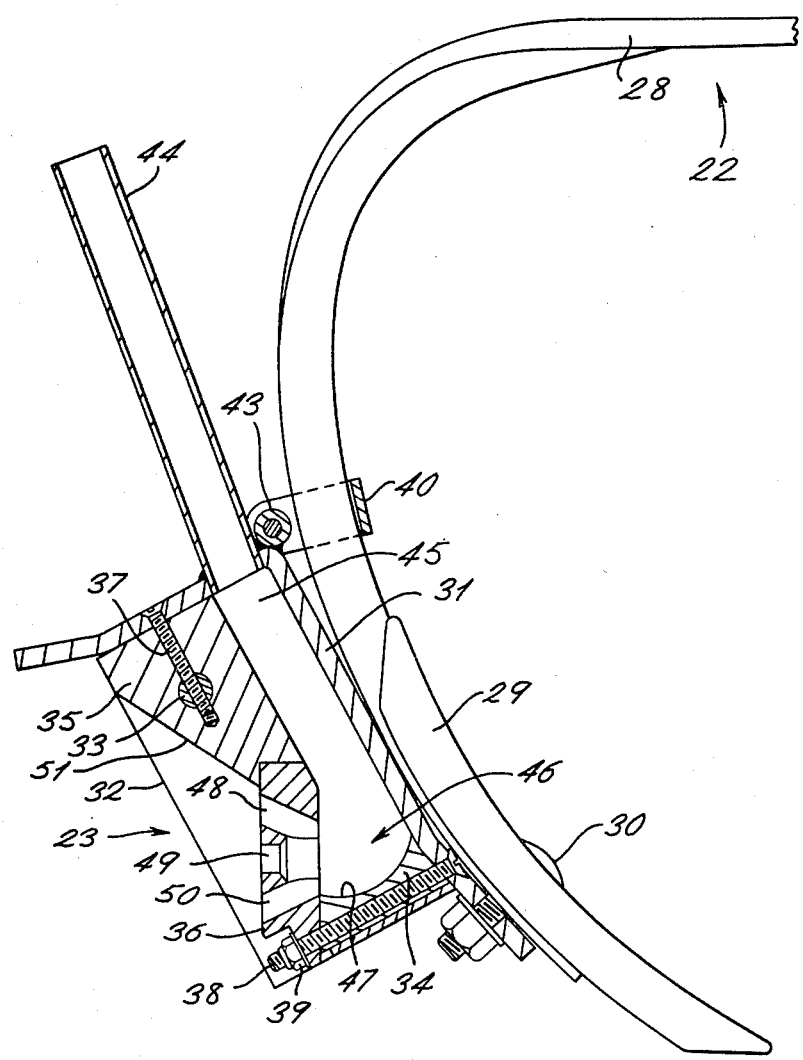
FIG. 2 is a side view partly in section of a tine and outlet means embodying the invention for injecting material in soil and forming part of the apparatus shown in FIG. 1.
Figure 3:
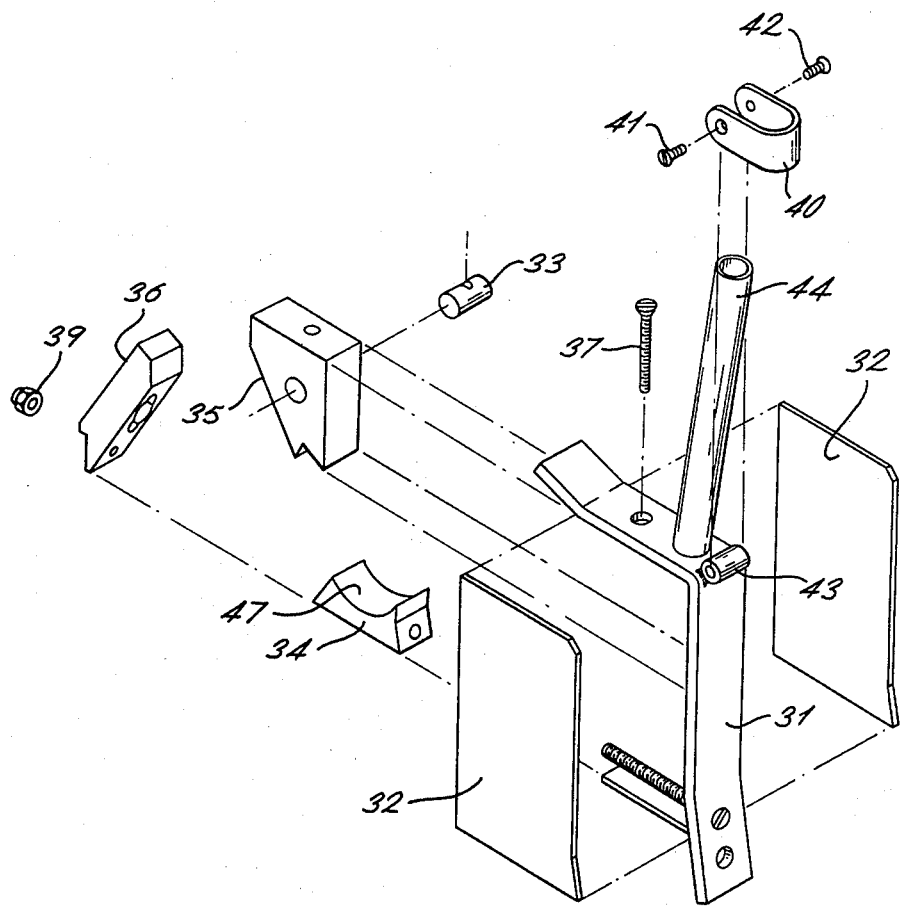
FIG. 3 is an exploded view of a number of parts of the outlet means shown in FIG. 2.

The twenty conduits 17 lead to twenty spring tines 22, each conduit 17 leading to a tine 22 individual thereto. The tines 22 are mounted on the frame 11 and are positioned in four transverse rows, the tines of each transverse row being spaced from each other by approximately 33 cms., and the corresponding tines of each succeeding transverse row being offset from each other by 12½ cms. Each tine 22 carries at its rear an outlet means 23 which is coupled to the end of the conduit 17 and will be described in more detail with reference to FIGS. 2 and 3.

Positioned at the front of the frame 11 are two further hoppers for granular nematicides of which one hopper 24 is shown in FIG. 1. In each case, the hopper has at its base a fluted metering roller housed in the housing 25 which feed nematicide by gravity down five tubes 26 to a manifold 27 for feeding a curtain of granular nematicide by gravity to the surface of the soil in front of the array of tines 22. This surface application of nematicide is in addition to the injection of nematicide by the outlet means 23 and may be regarded as optional. The surface application may only be necessary in some soil conditions.

Referring now to FIGS. 2 and 3, the detailed arrangement of the outlet means 23 will be described. In this description only a single outlet means 23 will be referred to although it will be appreciated that all twenty outlet means are of similar construction.

The spring tine 22 comprises a main spring member 28 and a coulter 29. A bolt 30 passing through the coulter 29 and the main spring member 28 fastens to the tine 22 a backbone member 31 of the outlet means 23. As shown in FIG. 3, the backbone member 31 is substantially right angled in shape and has welded to either side of it two side members 32. The side members 32 hold together a number of internal shaping members 34, 35 and 36 which define internal passages in the outlet means 23. The inner members 34 to 36 are bolted together in a sandwich, the side members 32 being welded to the backbone member 31. The inner members 34 to 36 are secured by bolts 37 and 38, the bolt 37 passing through a hole in the upper part of the backbone 31 and screwing into a cross-member 33 housed in the inner member 35. In similar manner, the bolt 38 passes through the inner member 34 and through the inner member 36 to be secured by a nut 39. The side plates 32 are first welded to the backbone 31, then the inner members 34, 35 and 36 are bolted to the backbone 31 to complete the sandwich. The backbone 31 is secured to the tine 22 by the bolt 30 already mentioned, and by a clamp 40 secured by two screws 41 and 42 threaded into an eyelet bracket 43. The whole assembly of the outlet means 23 comprising the backbone 31, side plates 32 and inner members 34, 35 and 36 is positioned behind the tine 22 and is shaped to be slightly narrower, than the tine 22 so as to reduce drag on the tine.

Rising from the top of the backbone member 31 is a rigid tube 44 to which is coupled the conduit 17. The inner member 35 is spaced from the backbone 31 and forms a first passageway 45 leading from the base of the tube 44 downwardly to a swirl chamber 46 formed by a curved inner wall 47 on the inner member 34. Outflow from the swirl chamber 46 is directed by three nozzles 48, 49 and 50 formed in the inner member 36. The axes of the nozzles 48, 49 and 50, are arranged to diverge from each other in a vertical plane. Preferably the divergence of the axes is in the range 20° to 30° between adjacent axes, and in the example shown is arranged to be 25° between adjacent axes. The axis of the nozzle 48 is arranged to align with the lower inclined face 51 of the internal member 35, and the axis of the lower nozzle 50 is arranged to be approximately at right angles to the backbone 31, and approximately at right angles to a tangent to the tine 22. The axis of the middle nozzle 49 is intermediate the other two axes and is directed slightly upwardly from the horizontal. The diameter of the outside opening of the inner nozzle 49 may for example be 0.37", as may be the diameters of the other two nozzles. The three nozzles at their inner ends may merge to a single flow passage within the inner member 36.

In operation as the frame 11 is moved over the land, the twenty tines 22 cut slit-like openings in the soil at a spacing of 12½ cms. As the openings are cut, the nematicide granules are blown down the conduits 17 and delivered into the openings in the soil. The granular material passes down the inlet tube 44 and the opening 45 of each outlet means and its direction is changed in the swirl chamber 46. The force of the air carrying the granules then sweeps the material against the three nozzles 48, 49 and 50 where the flow divides into three discrete jets which are blown rearwardly into the slit-like opening formed by the tine 22. It is found that even though the soil cut by the tine 22 may collapse inwardly filling the slit almost immediately, the force of the air-carried granules is sufficient to spread the granular material evenly in a vertical plane over a depth of about 6".

As shown in FIG. 1, there are provided on the frame 11 a pair of support legs 10 (of which one is shown in FIG. 1), the legs being positioned one on each side of the frame and being pivoted on the frame. These legs 10 hold the tines 22 and outlet means 23 clear of the soil when the machine is parked and not in operation. This is the position shown in FIG. 1. Upon lowering of the three point linkage of the tractor 12 and forward movement of the tractor, the legs 10 pivot rearwardly allowing the tines 22 to enter the earth. This arrangement reduces the likelihood of soil blocking the outlet means 23 when the machine is stationary.

By way of example of dimensions which may be used for the outlet means 23, dimensions may be as follows:

| | |
|---|---|
| Depth of outlet means between the top of the backbone 31 and the bottom of the inner member 34 | 5.25 inches |
| Depth from rear of inner member 35 to front of backbone 31 | 2.75 inches |
| Thickness of outlet means between plates 32 | 0.75 inches |
| Overall width of coulter 29 | 1.50 inches |
| Overall width of outlet means | 1.00 inch |

By way of example of materials which may be used to form the elements shown in FIGS. 2 and 3, the following may be used:

| | |
|---|---|
| Side members 32 | stainless steel |
| Backbone 31 | mild steel |
| Inner member 36 | brass |
| Inner members 34 and 35 | rigid p.v.c. |
| Retaining cross-member 33 | mild steel |
| Clamp 40 | mild steel |

| -continued | |
| --- | --- |
| Retaining bolt nut 39 | Nyloc nut |

In a modification (not shown) of the outlet means 23 described with reference to the drawings, the group of three outlet openings 48, 49 and 50 may be replaced by a single, elongated, slot-like opening. If necessary, baffles may be provided in the opening to guide the granular material into the required vertically dispersed distribution.

With regard to the aspect of the invention which provides a method of injecting granular material in soil, the operation of the apparatus shown in the Figures constitutes the first steps of the method of the invention. The remaining step is to distribute the granular material horizontally by agitating the soil. By way of example this may be done by treating the soil by a second pass of a tractor-drawn implement, the implement being a rotary earth working implement in which at least one rotor works the soil by rotation about a vertical axis or axis inclined to the horizontal. In a preferred arrangement the implement comprises an array of vertical axis rollers positioned transversely across the direction of forward movement of the implement, each rotor comprising two or more downwardly directed tines spaced from each other by a cross member which is mounted on a vertical axis and is rotated vigorously so as to carry the downwardly directed tines in a rotary motion about the vertical axis. Such an implement is commonly used to prepare a seed bed for sowing potatoes, so that the use of this implement to disperse the nematicide granular material horizontally in the soil does not require an extra pass of a tractor over the land. One example of such an implement is known by the trade name of "Lelyterra". It will be appreciated that in the first steps of the method according to the invention, using the apparatus illustrated, the nematicide material is injected in a series of vertical planes, and in the second part of the method the rotary soil working implement distributes the material horizontally.

It is a particular advantage of the method described above, that the working of earth by vertical axis rotors does not turn up the unweathered lower reaches of the soil to the extent which occurs with horizontal axis rotary cultivation. It is also an advantage that the vertical axis rotary soil working does not smear the soil and cause waterlogging to the extent found with horizontal axis rotary cultivation. Finally as mentioned above the vertical axis rotary cultivation step would normally be carried out in any case in preparing the seed bed, so that no additional time is lost in preparing the seed bed.

However it will be appreciated that although the apparatus and method embodying the invention have been described with reference to injecting and distributing nematicides, many other uses are envisaged. For example the apparatus and method may be used to inject and distribute other pesticides or fertiliser.

We claim:

1. Apparatus for injecting granular material in soil comprising:
    an outlet means having an elongated form for securing to the rear of a tine adapted for opening a vertical slit in the soil when dragged through the soil, the said outlet means being for securing to the rear of such a tine with the elongated form of the outlet means aligned generally along the length of the tine;
    said outlet means defining an inlet opening for connection to a conduit for delivering granular material under air pressure to said outlet means, and said outlet means defining at least one outlet opening adapted to direct granular material out from said outlet means said at least one outlet opening being oriented in an upward direction;
    said outlet means being shaped for guiding granular material in at least one flow path leading from said inlet opening, said at least one outlet opening adapted for directing the granular material out from said outlet means predominantly in an elongated distribution aligned generally in a common plane with said elongated form of said outlet means, and in a direction such as to be directed rearwardly of a tine when said outlet means is attached to the tine, said distribution including an upwardly directed component and each said outlet means including a swirl chamber operative to forcibly randomise the granular material immediately prior to its exit through said at least one outlet opening.

2. Apparatus according to claim 1 in which said outlet means has securing means for securing the outlet means to the rear of a tine in operation.

3. Apparatus according to claim 1 in which said outlet means defines a plurality of openings spaced apart from each other in a direction generally along the length of the said elongated form of the outlet means.

4. Apparatus according to claim 3 in which each outlet opening defines an axis along which granular material is predominantly directed in operation, and the plurality of outlet openings are disposed in such a manner that the axes of the openings all lie in a common plane with the said elongated form of the outlet means.

5. Apparatus according to claim 4 in which the said axes are inclined to each other within the said plane.

6. Apparatus according to claim 1 in which the outlet means includes a chamber disposed in the path of material flowing from the inlet opening to said at least one outlet opening said chamber having a curved wall disposed in the path of granular material entering the outlet means through the inlet opening and arranged for guiding the granular material through a change of direction along said at least one flow path leading to the said at least one outlet opening.

7. Apparatus according to claim 6 in which the said curved wall is arranged to guide at least a proportion of the granular material through a change of direction greater than 90°.

8. Apparatus for injecting granular material in soil comprising:
    a frame for forward movement over the soil;
    a plurality of tines, said tines being carried by the said frame, each tine being adapted for opening a vertical slit in the soil when dragged through the soil by movement of the said frame;
    a plurality of conduits for delivering granular material, each tine having a conduit associated therewith for delivering granular material to the rear of the tine; and
    a plurality of outlet means, each tine having associated therewith an outlet means connected to the conduit of the tine, each outlet means defining at least one outlet opening for directing granular material in a direction rearwardly of the tine relative to said forward movement of said frame and predominantely in a vertically dispersed distribution including at least one of said at least one outlet openings oriented in an upward direction for providing an upwardly directed component, each outlet means including a swirl chamber operative to forcibly randomise the granular material immediately prior to its exit through said at least one outlet opening and for guiding granular material from the said conduit to said at least one outlet opening.

9. Apparatus according to claim 1 in which each outlet means has a shape which defines a path for directing a proportion of the granular material upwardly in a direction inclined to horizontal.

10. Apparatus according to claim 8 in which each outlet means defines a plurality of openings spaced apart from each other vertically.

11. Apparatus according to claim 10 in which each opening defines an axis along which granular material is predominantly directed in operation, and the plurality of openings are disposed in such a manner that the axes of the openings all lie substantially in a single vertical plane.

12. Apparatus according to claim 11 in which at least one of the said openings has an axis inclined to the vertical in an upward direction and at least one of the openings has an axis inclined to the vertical in a downward direction.

13. Apparatus according to claim 10 in which the said plurality of openings are positioned substantially vertically one above another.

14. Apparatus according to claim 10 including an upper outlet opening for directing a proportion of granular material in an upward direction rearwardly of the tine, a lower outlet opening for directing a proportion of the granular material in a downward direction rearwardly of the tine, and a further outlet opening directed in a direction intermediate the directions of the upper and lower outlet openings.

15. Apparatus according to claim 8 in which each outlet means includes a chamber disposed between the conduit and said at least one outlet opening, said chamber having a curved wall disposed in the path of granular material leaving the conduit and arranged to guide the granular material through a change of direction along said at least one flow path leading to said at least one outlet opening.

16. Apparatus according to claim 15 in which the said curved wall is arranged to guide at least a proportion of the granular material through a change of direction greater than 90°.

17. Apparatus according to claim 15 in which the path of material entering the outlet means from the conduit is disposed in a single substantially vertical plane.

18. Apparatus according to claim 8 in which the conduit and outlet means associated with each tine have a width no greater than the width of the tine taken transverse to the direction of forward movement of the frame.

19. Apparatus according to claim 8 in which the outlet means associated with each tine is positioned immediately behind the tine and is secured directly to the tine.

* * * * *